United States Patent [19]

Stafford et al.

[11] 4,303,912

[45] Dec. 1, 1981

[54] DIGITALLY CONTROLLED COMPOSITE COLOR VIDEO DISPLAY SYSTEM

[75] Inventors: Irvin G. Stafford, Carlsbad; Charles L. Seitz, San Luis Rey, both of Calif.

[73] Assignee: Burroughs Corporation, Detroit, Mich.

[21] Appl. No.: 151,134

[22] Filed: May 19, 1980

[51] Int. Cl.$^3$ .............................................. G06F 3/153

[52] U.S. Cl. .................................... 340/703; 340/744; 340/748; 358/13

[58] Field of Search .................... 340/703; 358/11, 13, 358/16

[56] References Cited

U.S. PATENT DOCUMENTS 4,139,838 2/1979 Inose et al. .......................... 340/703

4,200,867 4/1980 Hill ...................................... 340/703

4,206,457 6/1980 Weisbecker et al. ............... 340/703

4,232,311 11/1980 Agneta ............................... 340/703

*Primary Examiner*—David L. Trafton

*Attorney, Agent, or Firm*—Mervyn L. Young; Kevin R. Peterson

[57] ABSTRACT

This disclosure relates to a color video system that is adapted to receive digital codes representing values of different colors that are to be displayed to create an image on a standard video monitor. The system employs a video synthesizer which includes a memory in which appropriate digital signals are stored representing the desired transformations of the signals to signals that are to be transmitted to the video monitor. Specifically, the system is adapted to transform respective color codes to codes required for the I, Q, and Y mode of transmission.

15 Claims, 7 Drawing Figures

DIGITALLY CONTROLLED COMPOSITE COLOR VIDEO DISPLAY SYSTEM

BACKGROUND OF THE INVENTION

1. Field of the Invention

This invention relates to the digital video display system, and more particularly to such a display system employing a color video encoder so as to provide composite color display.

2. Description of the Prior Art

Prior art display systems for data processing and the like were basically character displays wherein representations of characters were formed as a matrix of discrete points on the face of a cathode ray tube. Such a method of representation of characters predates electronics and may be found in embroidery, mosaics, and other disciplines employing a grid pattern. Such characters displayed on a cathode ray tube are of inferior readability unless the dot-matrix allowed for each character was much larger than 5×7 or 7×9, which are the most commonly used matrices.

Although such systems may be called video displays, they are without exception incompatible with broadcast video standards and use a standard television set or monitor in such a crude fashion that half of its spatial and all of its gray-scale resolution is lost in forming an image.

The most important reason why designers have avoided the standard broadcast type of video raster is that it is interlaced. By producing the complete frame of two interlaced fields, broadcast video achieves twice the resolution that can be achieved at that scan rate without interlace. However, dot-matrix characters appear to "flicker" when interlaced fields are used, particularly if the great majority of dots over any local region happen to fall within one or the other field. "Flicker" is a problem when interlace is employed not only for dot-matrix characters but also when there are very high contrast images. Thus, even when a standard video monitor is employed as the display device, such as for a video terminal, it is used without interlace and is limited in its vertical resolution. Because this resolution is not adequate to display a large number of good quality dot-matrix characters, some systems must employ video rasters which are incompatible with standard video monitors. It is desirable to employ standard video monitors because of their economy due to mass production.

A display system which overcomes the "flicker" problem and also successfully employs a standard monitor with interlaced scan is disclosed in the Seitz et al U.S. Pat. No. 4,158,200, which system displays characters that are made up of a plurality of different gray-scale levels or levels of luminance to create the full image of the character to be displayed on the display monitor. While the system of the Seitz et al patent can display a plurality of different gray-scale levels or luminance levels, it is not capable of displaying colored images so as to take advantage of commercially available color video sets or monitors. This invention is directed at extending the inventions described in the Seitz et al patent to color display, and in particular to the color broadcast system used in the United States (reference to National Television Standards Committee (NTSC)). Other color broadcast systems in use through the world differ from the NTSC system only in certain parameters and not in any fundamental way, so that the techniques described here are equally applicable to all major color broadcast systems.

It is evident to one skilled in the art that the basic techniques of the Seitz et al patent, in particular the use of gray-scale shading, can be applied to color images by applying the technique individually to the red, green, and blue components of the color image. However, for broadcast systems only a single signal, not three separate signals, controls the mixing of red, green, and blue. What follows particularly addresses the problem of synthesizing the single signal from a digital specification of color.

Initial attempts at digitally controlled color video systems to simulate many combinations of colors and to "colorize" gray-scale pictures resulted in images which appear to "glimmer". That is to say, if a picture with high frequency video components was colorized, a crawling effect appeared along the edge where abrupt changes in color occurred. This effect was caused by a lack of bandwidth limiting of the chrominance signal.

This could be corrected in part by encoding the luminance information separately from the chrominance information and employing digital filters. However, the filters cause a delay in the generation of the color information with respect to the luminance information and the large area of the analog section of the system was devoted to adjustments. Furthermore, the color filtering was not to standards accepted by the Federal Communications Commission (FCC) for the compatible, composite, color video waveform.

It is, then, an object of the present invention to provide an improved digital display system for the color display of characters, images, and other information.

It is another object of the present invention to provide an improved digitally controlled color video display system for pictures with high frequency video components without incurring "glimmer" effects.

It is still another object of the present invention to provide a display system that employs digital control for standard commercial video monitors.

SUMMARY OF THE INVENTION

In order to achieve the above-identified objects, the present invention is directed toward a color video system that is adapted to receive digital codes representing values of different colors which are to be displayed to create an image on a standard video monitor. The color codes are converted to values representing signals that are to be transmitted to the monitor. The conversion is under digital control. To this end, the system employs a video synthesizer which includes a memory in which the appropriate digital signals are stored representing the desired transformations. Specifically, the system is adapted to transform respective color codes into codes required for the I, Q, and Y mode of transmission. Chrominance is encoded into I and Q, and luminance is encoded into Y.

A feature, then, of the present invention resides in a digitally controlled video synthesizer for a display system which includes a memory in which the appropriate digital signals are stored representing the desired transformation. A specific feature resides in such a system which is adapted to transform respective color codes into codes required for the I, Q, and Y mode of transmission.

BRIEF DESCRIPTION OF THE DRAWINGS

The above and other objects, advantages, and features of the present invention will become more readily apparent from a review of the following specification when taken in conjunction with the drawings wherein.

GENERAL DESCRIPTION OF THE INVENTION

Figure 1:
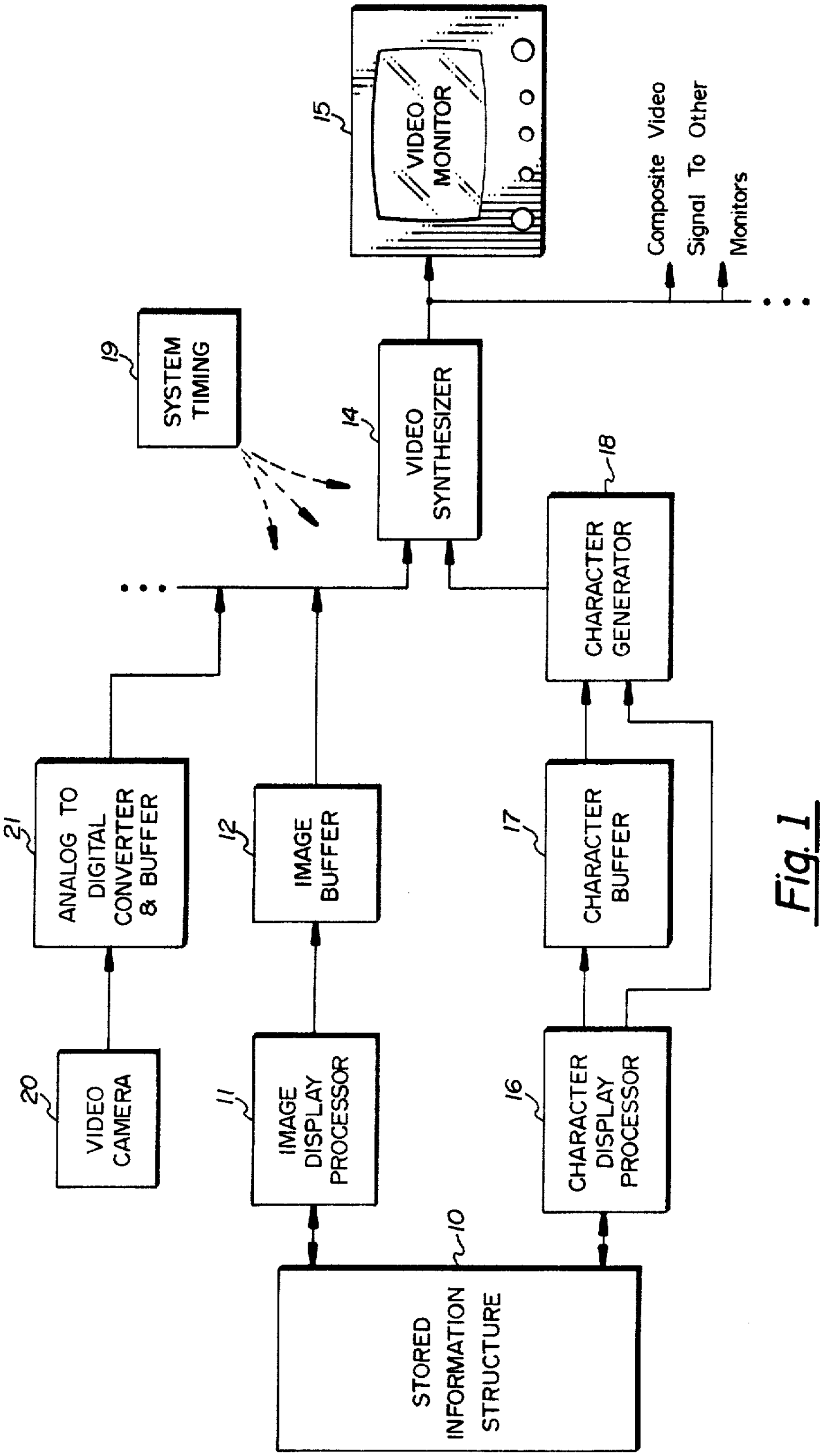
FIG. 1 is a representation of a system employing the present invention.

The present invention is directed toward the color display of digital information and images, whether those images be generated by a color video camera or are created by an image processor from information stored in the system. The organization of a system employing the present invention is illustrated in FIG. 1. As shown therein, stored information structures are fetched from information storage 10 by image display processor 11 which controls the communication between storage 10 and the display system of the present invention. Image codes are transferred to image buffer 12 and then to video synthesizer 14 where they may be mixed with other signals representing other images such as characters and synchronization signals to provide the composite video signals that are supplied to the standard video monitor 15. In addition, character display processor 16 and character buffer 17 and character generator 18 are provided in parallel with the image display processor 11 and image buffer 12 when it is desired to superimpose character text upon some other image. As indicated in FIG. 1, image signals may be received from other sources such as a video camera 20 having an appropriate analog-to-digital converter 21 to convert the analog signals from the camera to the digital code required by the present invention.

For video representation of an image, a signal must be provided which produces on a video monitor an approximation of that image which is close enough to what is perceived by the human eye. A video camera will convert the image to a signal for the display of natural scenes. For synthetic images, such as character or graphic display, a synthetic video signal is produced electronically according to information stored within or delivered to the electronic system.

The usual analog video art requires two discrete approximations be made to present an approximation to a natural scene. The scene is composed of a sequence of discrete frames and each frame is composed first of a sequence of discrete scan lines. As the scan lines are traversed in sequence, the time-varying video signal is a representation of the luminance and chrominance of the corresponding point in the scan. The justification for the discrete frames is the unconscious reconstruction of motion by the human observer and the justification for the discrete scan lines is the limited resolution of the human eye.

For the display of digitally synthesized video images such as character or graphic displays, two additional discrete approximations are made. First, each scan line is composed of a sequence of discrete picture elements (pixels). Second, each pixel has a luminance and chrominance value which in the present invention is approximated by one of a number of discrete values according to a sequence of binary digits. The justification for the discrete approximation of the pixel is the limited resolution of the eye and equates through a sampling theorem to the bandwidth limit in an analog video signal. The justification for the discrete approximation of the luminance and chrominance value is the limited ability of the eye to discriminate luminance and chrominance when a sufficient number of levels of approximations are employed.

According to these additional approximations, an image may be represented as an array of values, either discrete or continuous. If these values are extracted from digital storage and produced in the order and rate corresponding to the adopted scanning order and rate, these values may be converted to an analog video signal conforming to some adopted standard and the image may be displayed using a standard video monitor.

For gray-scale or color pictures, the digital code required for each pixel is more than one bit. A two-bit code allows four levels of gray or four colors, a three-bit code allows eight levels of gray or eight colors, and so forth. The gray-scale and color resolution is established by the number of bits in the code. The lower bound is one bit; the sensible upper bound is determined by psychovisual experiments and by accuracy of the conversion procedures between the digital and analog domains of the system.

Additional considerations must be taken into account for a color video display. The eye resolves the radiant light energy of a color into a specific wavelength (hue) at a light level above white (saturation), and at a particular energy level (brightness or luminance). Hue and saturation are the components of the color that distinguish it from black, gray, or white. They are the additional information conveyed by the chrominance signal. If the components of one color are mixed with another color, a third color results. For example, adding red light to green light yields yellow light. Mixing colored lights to match another color follows specific rules. The use of three suitable colors is sufficient to match most other colors. For color television, red, green, and blue were selected as the base colors.

A color video camera has three pick-up tubes that convert light energy into electrical energy. The tubes are arranged so that each responds only to one color. Each tube is adjusted so that it will produce a one-volt output when its particular color is scanned. When the white color is scanned, all three channels will be at one volt.

The mixing of equal quantities of all three colors gives white, but the contribution of each color to the brightness level is different. The output voltage of each color is combined in a matrix to form the "Y", or luminance signal. The matrix receiving the different color signals is adjusted to produce a one-volt signal when a white bar is scanned according to the relation:

$$E_Y=0.30E_r+0.59E_g+0.11E_b$$

Where $E_Y$ is the volt of the luminance signal output, $E_r$ is one volt of the red channel output to the matrix; $E_g$ is one volt of the green channel output; and $E_b$ is one volt of the blue channel output.

Chrominance information is the result of subtracting the luminance information from the three color channel outputs. This yields the color difference signals as follows:

$$E_r - E_Y = -0.70E_r - 0.59E_g - 0.11E_b$$

$$E_g - E_Y = -0.30E_r - 0.41E_g - 0.11E_b$$

$$E_b - E_Y = -0.30E_r - 0.59E_g - 0.89E_b$$

Only two signals in addition to the luminance signal $E_Y$ need be transmitted to the display monitor because at the display monitor the $E_g - E_Y$ signal can be derived from the $E_r - E_Y$ and the $E_b - E_Y$ signals by the following relation:

$$E_g - E_Y = 0.51(E_r - E_Y) - 0.19(E_b - E_Y)$$

Figure 2:
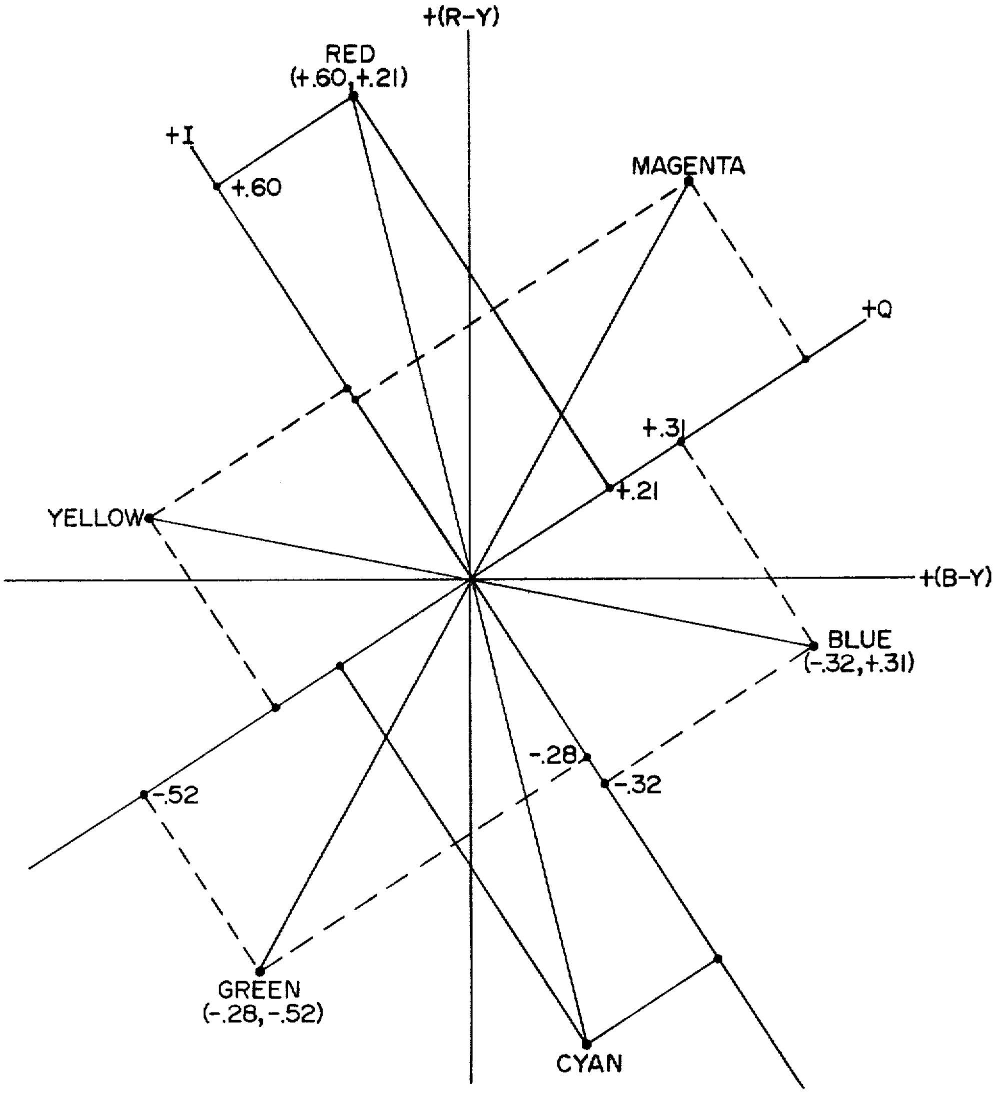
FIG. 2 is a phase diagram representing the relation between the signals employed to represent the various colors to be displayed by the system of the present invention.

In plotting the phase relationships between the different signals employed in a color video system, one can use the $E_r - E_Y$ and $E_b - E_Y$ signals as the orthoganal axis of the graph. Such a graph is illustrated in FIG. 2.

The angular resolution of the eye for various colors is not uniform. If a blue object, such as a car, drives away from an observer, at some point the color blue can no longer be discerned. The distance is greater for red. These facts allow optimal bandwidth limiting of the chrominance signal by using the I and Q axes as illustrated in FIG. 2. The equations for transformation to the I and Q axes are:

$$E_I = 0.60E_r - 0.38E_g - 0.32E_b$$

$$E_Q = 0.21E_r - 0.52E_g - 0.32E_b$$

Analog encoding of the values along the I and Q axes is accomplished by the use of subcarrier modulation. A "color burst" establishes a fixed reference signal that the commercial display monitor can lock onto. The I and Q information is used to phase modulate a signal relative to the reference signal. The frequency of the subcarrier is fixed by standards established by the National Television Standards Committee (NTSC) and accepted by the Federal Communications Commission (FCC). It is the highest odd harmonic of one-half the scan frequency (45512 times the scan frequency) that would not exceed the bandwidth restrictions, not interfere with the audio subsystem. This harmonic relationship to the scan line frequency results in an apparent cancellation of the effects of the high frequency component. This cancellation is necessary so that the addition of color information will not interfere with the normal monochrome set operation.

Figure 3:
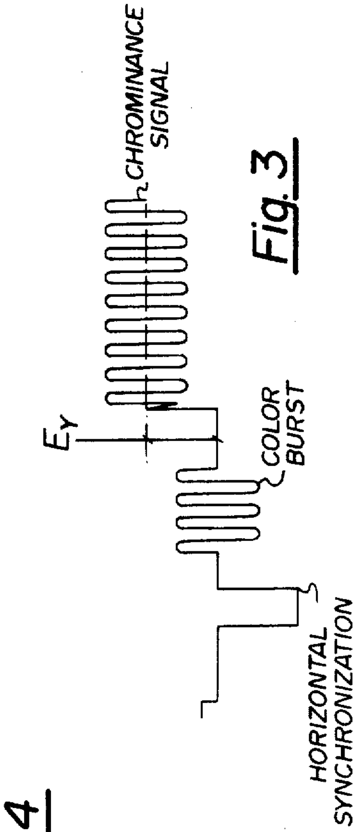
FIG. 3 is a waveform of signals as employed in the present invention.

The reference signal is a burst of a 3.579545 MHz signal which follows the horizontal synchronization pulse. Its timing and amplitude are also fixed by the above-referred-to standard. This timing is illustrated in FIG. 3. The position of the burst is on the $-(B-Y)$ axes of FIG. 2. The $+I$ axis lags the reference burst by 57°. FIG. 3 also illustrates the relation between the luminance value $E_Y$ which is the DC voltage signal for the picture element to be displayed and the degree of saturation which is the amplitude of the voltage displacement of the signal from the luminance. The complete chrominance signal is the degree of saturation and the color hue which is the phase relation between the chrominance signal and the color burst.

Full saturation is the maximum voltage allowed by the NTSC standard. For example, a fully saturated red scene would produce a signal with a phase angle that lags the color burst by 76.5°. The degree of saturation or the chrominance amplitude signal would be 0.63 volts and the luminance value or DC offset would be 0.30 volts. A less saturated red (e.g., pink) would have a signal with the same phase angle but with a lesser chrominance value and a different DC offset.

In one embodiment of the present invention, the composite video signal output is made up of the encoded color signals $E_I$ and $E_Q$ and the luminance signal $E_Y$. In another embodiment of the present invention the color information is encoded along the $E_R - E_Y$ and $E_B - E_Y$ axis of FIG. 2 and these signals are transmitted with the $E_Y$ luminance signal to the standard video monitor. In still another embodiment of the present invention, the digitized red, blue and green signals are directly converted to video signals for transmission to the video monitor.

DETAILED DESCRIPTION OF THE INVENTION

The transformation of the digitized color code into the I, Q and Y code is performed in the present invention by video synthesizer 14 of FIG. 1. This synthesizer is illustrated in more detail in FIG. 4 and includes transform logic 22, as well as digital-to-video converter 23. In addition, the synthesizer includes digital filters 24 and 25 between transform logic 22 and converter 23. Also shown in FIG. 4 is the Y DAC 28, Y delay compensation 26, color burst gate 27, and output summing amplifier 29, which will be more thoroughly described below.

Figure 4:
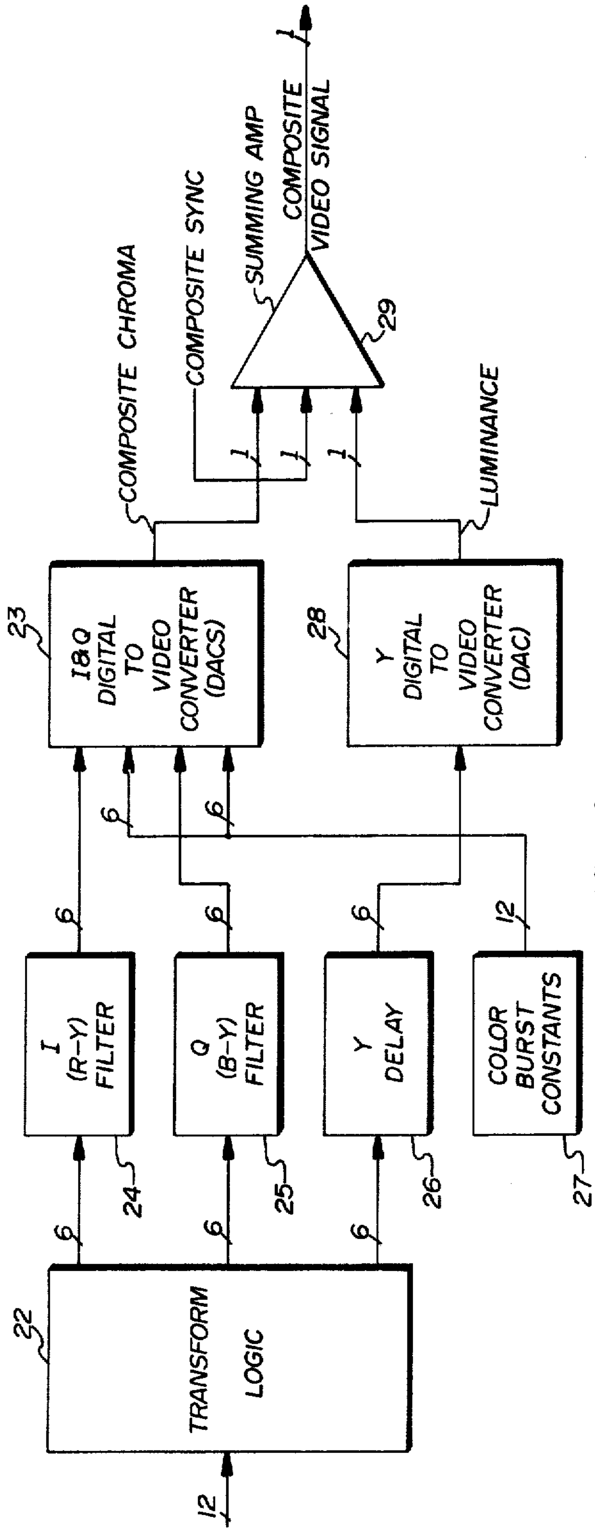
FIG. 4 is a schematic diagram representing the present invention.
Figure 5:
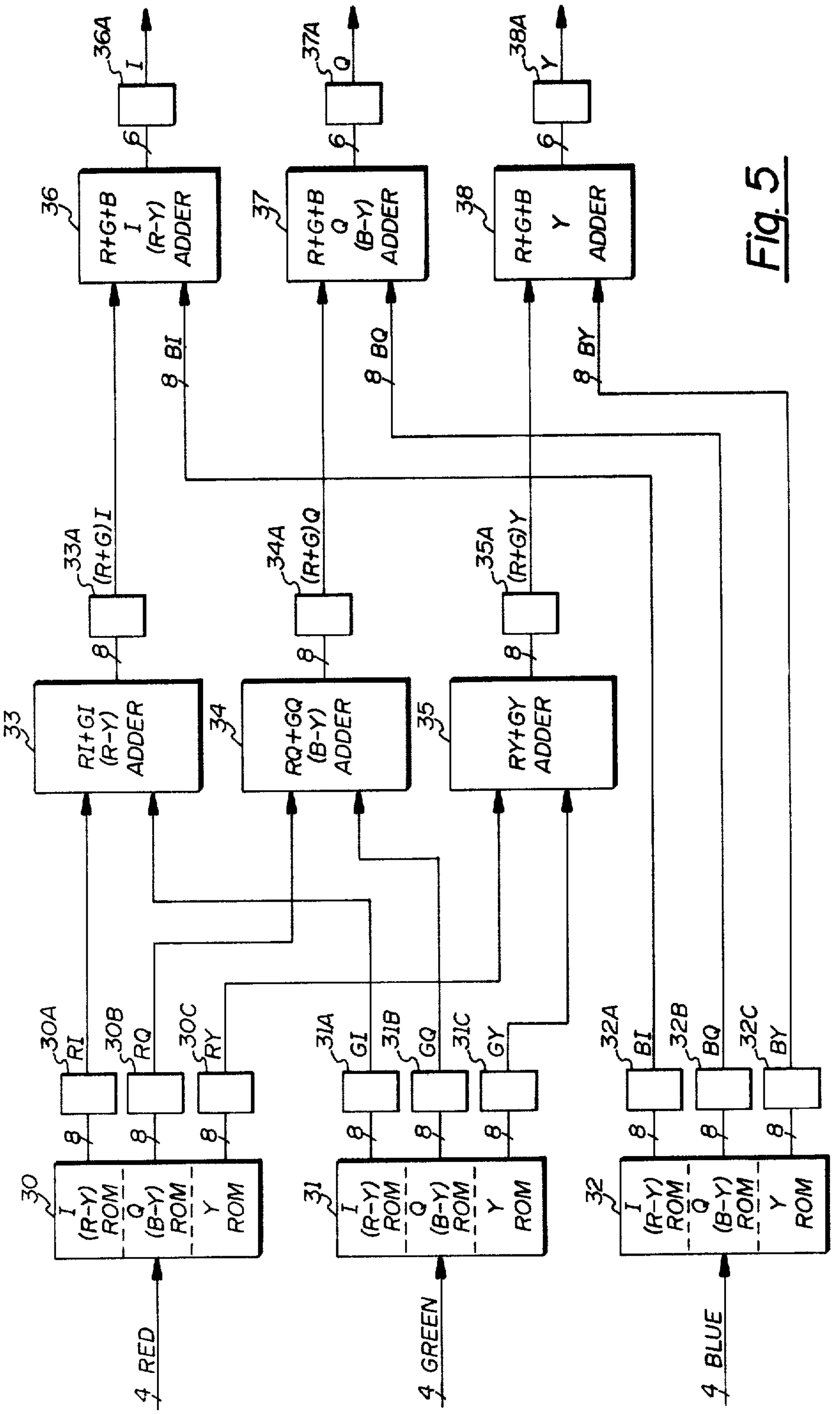
FIG. 5 is a schematic diagram of the color transform logic as employed in the present invention.

Transform logic 22 of FIG. 4 is illustrated in more detail in FIG. 5 and includes ROM sets 30, 31 and 32, each of which is comprised of three 16×8 individual ROM's in which are stored the 16 sets of eight-bit signals for the I, Q and Y transformations of the four-bit red, green and blue inputs respectively. That is to say, the respective four-bit color inputs are addresses to the respective ROM's in which are stored the corresponding signals required to generate the $E_I$, $E_Q$ and $E_Y$ signals according to the corresponding equations that have been described above. The corresponding components are then to be summed together and for this purpose, adder sets 33, 34 and 35, as well as adder sets 36, 37 and 38 are concatenated as illustrated in FIG. 5.

Each of the ROM sets and adder sets are provided with output registers or latches to receive and hold the corresponding signals until the next system clock. That is to say, ROM set 30 is provided with register 30A, adder set 33 is provided with register 33A, and adder set 36 is provided with register 36A, and so forth. In this manner, the respective transformations are "pipelined". For example, after receipt of red, green and input signals, registers 30A, B and C; registers 31A, B and C, and registers 32A, B and C will receive the respective I, Q and Y signals one clock time later. Two clock times later, registers 33A, 34A and 35A will receive the partial sum of those values while registers 30A, B and C; 31A, B and C, and 32A, B and C will be receiving transform signals for the next picture element. Three clock times later, registers 36A, 37A and 38A will receive the complete sum of transform values while registers 33A, 34A and 35A will receive the partial sum values for the next picture element and registers 30A, B and C; 31A, B and C, and 32A, B and C will receive transform signals for the third picture element, and so forth.

Figure 6:
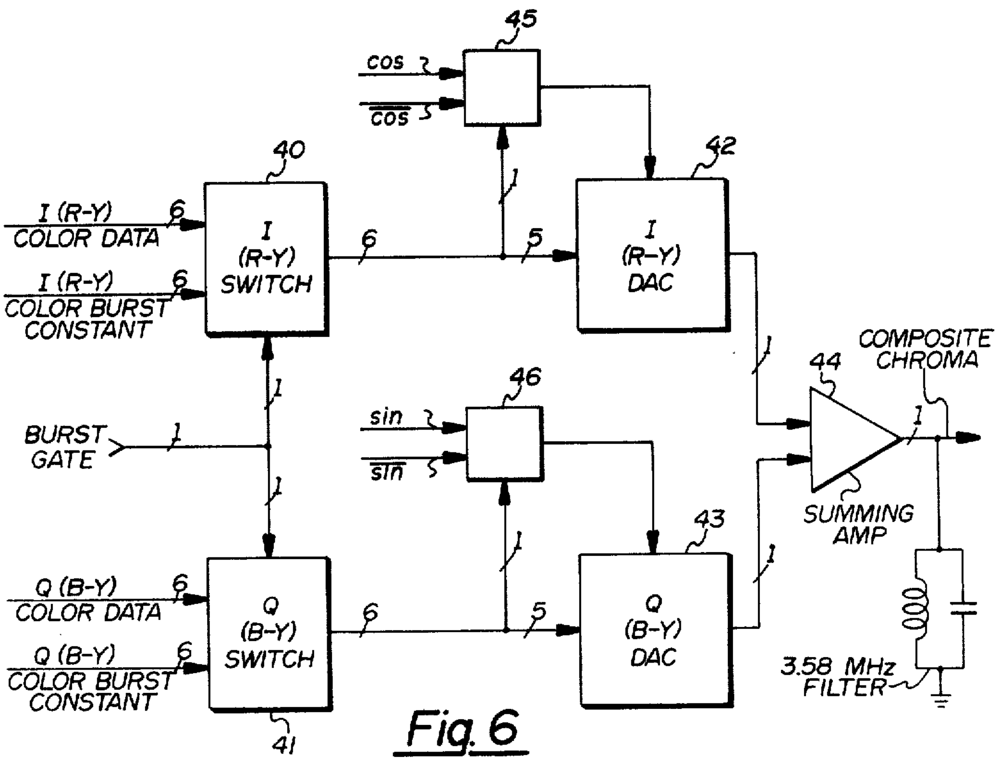
FIG. 6 is a schematic diagram of the color digital-to-video converter as employed in the present invention.

The respective six-bit digits for the I and Q color data are received by the digital video converter 23 of FIG. 4 which is illustrated in more detail in FIG. 6. In addition, converter 23 receives six-bit I and Q color burst constants as required to generate the color burst signal described above. The corresponding sets of signals are received by I switch 40 and Q switch 41 which select between respective inputs in accordance with whether a signal is present on the burst gate line. The selected data is then transmitted to the corresponding I DAC 42 and Q DAC 43. The output of the I DAC and Q DAC are then provided to summing amplifier 44.

DAC's 42 and 43, as well as Y DAC 28 of FIG. 4, are of the R/2R ladder-type multiplying DAC's which receive digital input signals by way of appropriate NAND gates. In addition, I DAC 42 and Q DAC 43 receive corresponding square-wave phase signals which are ANDed with the respective amplitude signals in the ladder network. As indicated in FIG. 6, one bit of the six-bit data set received from the respective switches 40 and 41 is employed to activate selection switches 45 and 46 to select the appropriately phased signal as required for the particular video data signal output. That is to say, one bit of the six-bit data set is employed to indicate the phase of the chrominance signal according to which quadrant of the I and Q plane is the quadrant in which the particular video signal is to reside.

A particular feature of the present invention resides in the ability of the respective I DAC and Q DAC to receive square-wave signals and sum them together by way of summing amplifier 44 to create the appropriate chroma signal that will eventually be received by the standard commercial video monitor.

Figure 7:
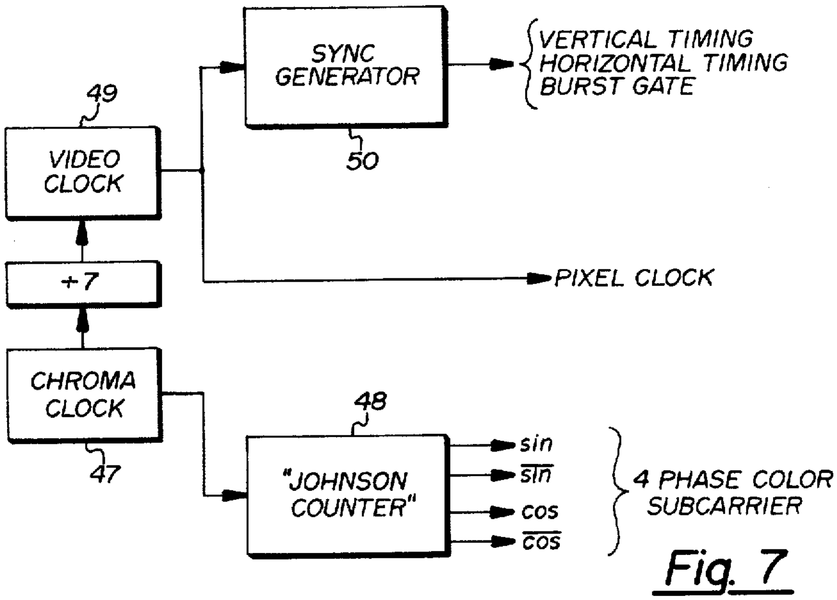
FIG. 7 is a schematic diagram of the timing system employed in the present invention.

FIG. 7 illustrates color clock 47, which generates a signal of 14.318180 MHz to drive four-phase Johnson counter 48 that provides the respective phases at the 3.579545 MHz frequency to drive DAC's 42 and 43. Color clock 47 also drives sync generator 49.

The output from summing amplifier 44 of FIG. 6 is then provided to summing amplifier 29 of FIG. 4, where it is summed with the output signal of Y DAC 28 to create the resultant composite video signal for transmission to a standard video monitor. Y delay 26 of FIG. 4 is provided so that the Y component output of transform logic 22 is received by the Y DAC 28 in synchronism from the respective chroma data received by digital-to-video converter 23. The composite video signal generated by the synthesizer of FIG. 4 now contains the signals and frequencies required for transmission of information representing the I, Q and Y components necessary to drive a standard video monitor.

With the system thus described, transformations can be made of digital red, green and blue signals into either encoded I, Q and Y signals or R−Y, B−Y and Y signals. In addition, the digital video encoder can receive the digitized red, green and blue signals for direct conversion to the video signal. This can be done either by storing appropriate signals in the different ROM's for a one-to-one transformation, or for bypassing the transformation ROM's altogether.

EPILOGUE

A digitally-controlled display system has been described which provides a low-cost, reproducible, adjustment-free system for color displays. Furthermore, the system is fully compatible with NTSC standards, including proper bandwidth limiting. The phase control is fully digital and, thus, standard digital components can be used so that the system might be readily implemented in integrated circuit chips designed for binary operation.

While a system has been disclosed for I, Q and Y encoding, the system can be readily encoded in other color representations. For example, low cost color cameras which use R−Y and B−Y encoding can be accommodated. The system is compatible with standard video monitors so that loss of the color system will not disrupt the monochrome operation.

While but one embodiment of the present invention has been described, it will be evident to those skilled in the art that variations and modifications can be made therein without departing from the spirit and scope of the present invention as claimed.

What is claimed is:

1. A color video display system comprising:
transformation means to receive a plurality of digital codes representing base colors to be displayed and having a plurality of outputs on which are placed digital signals representing differences between at least two of said base color values and a luminance value; and
digital-to-video converter means coupled to said transformation means and adapted to provide outputs representing phase-encoded signals of said transformation outputs.

2. A system according to claim 1 wherein:
said transformation means is adapted to provide digital signal outputs representing values of the I and Q components of said received digital codes.

3. A system according to claim 1 wherein:
said transformation means includes a memory in which said digital signals are stored.

4. A system according to claim 1 wherein:
said transformation means includes a luminance portion thereof having an output on which are placed digital signals representing a luminance component value; and
said digital-to-video converter means includes luminance means to convert said luminance digital signals to phase-encoded signals.

5. A system according to claim 4 further including:
summing means coupled to said converter means to combine the phase-encoded signals received therefrom to provide a composite video signal.

6. A system according to claim 1 further including:
storage means having digital signals stored therein representing said base color values; and
processing means coupled between said storage means and said transformation means to provide said base color values to said transformation means.

7. A color video display system comprising:
transformation means to receive a plurality of digital codes representing base colors to be displayed and having a memory in which are stored digital signals representing differences between at least two of said base color values and a luminance value; and
digital-to-video converter means coupled to said transformation means and adapted to provide outputs representing phase-encoded signals of said transformation outputs.

8. A system according to claim 7 wherein:
said transformation means is adapted to provide digital signal outputs representing values of the I and Q components of said received digital codes.

9. A system according to claim 7 further including:
storage means having digital signals stored therein representing said base color values; and
processing means coupled between said storage means and said transformation means to provide said base color values to said transformation means.

10. A system according to claim 7 further including:
a video camera to generate video signals representing an image; and
analog-to-digital converter means to convert said video signal to digital signals, said converter means being coupled between said camera and said transformation means.

11. The system according to claim 7 wherein said digital-to-video converter means includes:
a source of a plurality of square-wave signals which differ in phase from one another;
means coupled to said square-wave source to receive said different square-wave signals and to impose an amplitude on each of said signals according to said digital signals received from said transformation means; and
summing means to sum together said different square-wave signals to provide an output video signal.

12. A system according to claim 11 wherein said digital-to-video converter further includes:
second means to provide a DC signal representing a luminance value; and
second summing means to provide the sum of said DC signal with said video output signal.

13. A color video display system comprising:
a source of digital signals representing different values;
a source of a plurality of square-wave signals which differ in phase from one another;
means coupled to said square-wave source to receive said different square-wave signals and to impose an amplitude on each of said signals according to said digital signals received from said digital signal source; and
summing means to sum together said different square-wave signals to provide an output video signal.

14. A system according to claim 13 which further includes:
second means to provide a DC signal representing a luminance value; and
second summing means to sum said DC signal with said video output signal.

15. A system according to claim 13 further including:
switching means to switch between one of said plurality of square-wave signals and another.

* * * * *